(12) United States Patent
Hayward et al.

(10) Patent No.: US 10,030,199 B2
(45) Date of Patent: Jul. 24, 2018

(54) PYROLISIS APPARATUS

(75) Inventors: David E. Hayward, Brazil, IN (US); Sherman Aaron, North Wilksboro, NC (US)

(73) Assignee: BIXBY ENERGY SYSTEMS, INC., Wilmington, DE (US)

( * ) Notice: Subject to any disclaimer, the term of this patent is extended or adjusted under 35 U.S.C. 154(b) by 1278 days.

(21) Appl. No.: 12/925,488

(22) Filed: Oct. 21, 2010

(65) Prior Publication Data

US 2011/0180382 A1 Jul. 28, 2011

Related U.S. Application Data

(63) Continuation-in-part of application No. 12/590,391, filed on Nov. 5, 2009, now Pat. No. 9,688,934, and a continuation-in-part of application No. 12/291,188, filed on Nov. 6, 2008.

(60) Provisional application No. 61/341,883, filed on Apr. 6, 2010, provisional application No. 61/137,213, filed on Jul. 28, 2008, provisional application No. 61/004,082, filed on Nov. 23, 2007.

(51) Int. Cl.
| | |
|---|---|
| *C10B 47/22* | (2006.01) |
| *C10B 1/04* | (2006.01) |
| *C10B 49/08* | (2006.01) |
| *C10B 51/00* | (2006.01) |
| *C10L 3/08* | (2006.01) |
| *C01B 32/05* | (2017.01) |

(52) U.S. Cl.
CPC ............. *C10B 47/22* (2013.01); *C01B 32/05* (2017.08); *C10B 1/04* (2013.01); *C10B 49/08* (2013.01); *C10B 51/00* (2013.01); *C10L 3/08* (2013.01)

(58) Field of Classification Search
CPC .. C10B 1/04; C10B 47/22; C10J 3/485; C10J 3/487; C10J 3/526; C10J 2300/1807; C10J 2300/1823
USPC ......................................... 202/105, 109, 270
See application file for complete search history.

(56) References Cited

U.S. PATENT DOCUMENTS

| | | | | |
|---|---|---|---|---|
| 2,038,051 | A * | 4/1936 | Lymn | 202/248 |
| 3,331,754 | A * | 7/1967 | Mansfield | 201/39 |
| 3,481,720 | A * | 12/1969 | Bennett | 48/89 |
| 4,388,173 | A * | 6/1983 | Escher et al. | 208/407 |
| 4,563,246 | A * | 1/1986 | Reed et al. | 202/100 |
| 4,659,456 | A * | 4/1987 | Rammler et al. | 208/407 |
| 4,872,954 | A * | 10/1989 | Hogan | 202/105 |
| 5,078,836 | A * | 1/1992 | Hogan | 201/7 |
| 5,407,809 | A * | 4/1995 | Finn | 435/41 |
| 5,453,164 | A * | 9/1995 | Breu | 202/136 |
| 5,861,046 | A * | 1/1999 | Andersson | 48/77 |
| 6,105,275 | A * | 8/2000 | Aulbaugh et al. | 34/424 |
| 6,203,765 | B1 * | 3/2001 | Taciuk et al. | 422/210 |
| 6,226,889 | B1 * | 5/2001 | Aulbaugh et al. | 34/424 |
| 6,379,629 | B1 * | 4/2002 | Kanai | 422/204 |
| 7,029,635 | B2 * | 4/2006 | Kashiwagi et al. | 422/184.1 |

(Continued)

*Primary Examiner* — Jonathan Miller
(74) *Attorney, Agent, or Firm* — Fish & Richardson P.C.

(57) ABSTRACT

A pyrolysis apparatus, including a retort tube in a closed loop configuration the retort tube defining a single entrance point and two exit points, a vortex separator joined to retort tube; and a plurality of fins positioned in spiraling rows about the retort tube, the fins extending through and sealed to a wall of the retort tube, the fins simultaneously extending beyond either side of the wall and being positioned to be a static mixer inside and outside the retort tube.

19 Claims, 9 Drawing Sheets

(56) References Cited

U.S. PATENT DOCUMENTS

| | | | |
|---|---|---|---|
| 7,264,694 B2 * | 9/2007 | Merrell et al. | 202/105 |
| 8,246,788 B2 * | 8/2012 | Teal et al. | 202/100 |
| 8,323,589 B2 * | 12/2012 | Hamby et al. | 422/608 |
| 8,354,084 B2 * | 1/2013 | Tallis | 422/659 |
| 8,366,882 B2 * | 2/2013 | Rinker | 201/8 |
| 8,470,134 B2 * | 6/2013 | Rinker | 201/29 |
| 2010/0329963 A1 * | 12/2010 | Sceats et al. | 423/437.1 |

* cited by examiner

PYROLISIS APPARATUS

CROSS-REFERENCE TO RELATED APPLICATIONS

The present application is a continuation-in-part application of U.S. application Ser. No. 12/590,391 filed on Nov. 5, 2009 and entitled PROCESS AND PROCESSOR OF NATURAL GAS AND ACTIVATED CARBON TOGETHER WITH BLOWER, which is a continuation-in-part of U.S. application Ser. No. 12/291,188 (the '188 application), filed Nov. 6, 2008 entitled FLOW RATE OF GAS IN FLUIDIZED BED DURING CONVERSION OF CARBON BASED MATERIAL TO NATURAL GAS AND ACTIVATED CARBON and claims priority therefrom. The '188 application claims benefit of U.S. Provisional Patent Application 61/004,082, filed Nov. 23, 2007 entitled CLOSED LOOP FLUIDIZED BED FLASH GASIFICATION SYSTEM and U.S. Provisional Patent Application 61/137,213, filed Jul. 28, 2008 entitled LIQUIFACTION PROCESS FOR CHANGING ACTIVATED CARBON AND SYNGAS INTO DIESEL FUEL. The present application is also related to provisional application 61/341,883 filed on Apr. 6, 2010 and entitled DUAL CO-EXTENSIVE AND CO-DIRECTIONAL CONVEYANCE SYSTEM IN GASIFICATION MACHINE AND METHOD OF OPERATION. All of the above applications are incorporated herein by reference as if fully set forth herein.

FIELD OF THE INVENTION

The present invention relates to gasification machines used to pyrolytically remove natural gas from biomass, ancient through modern forms, and more particularly to use of static mixers in such systems.

BACKGROUND OF THE INVENTION

Coal has long been used as a source of fuel. As the search for alternative fuels increases, several inventors have been looking toward further developing technology related to the use of coal. These inventors have come to recognize that the natural gas found in coal is not limited to coal, but rather is found in various forms of man-made and naturally occurring substances including, but not limited to municipal solid waste, sewage, wood waste, biomass, paper, plastics, hazardous waste, tar, pitch, activated sludge, rubber tires, oil-based residue and coal. Coal is merely an ancient form of biomass and it appears all biomass forms have accessible natural gas therein.

The question has generally not been where one should look for natural gas, but rather how to liberate the natural gas. This has led to several different confined gasification liquefaction techniques. A variety of conveyance systems are used to move feedstock through the apparatus. The present system uses a blower as a mechanism to convey feedstock through a tube during processing.

Fluid dynamics provide that gases do not all move through a tube at the same speed. Friction adjacent the tube typically slows some gases. The friction causes a ripple effect where gases move faster the further away the gases are from the point of friction and slower the closer the gases are to the friction. Should the heating be provided from outside the tube, the same fluid dynamic problems may also exist.

Uneven heating is realized when one adds feedstock of a much cooler in temperature to the heated gases within the tube. The fast feedstock positioned within the fast moving gases have less time to reach reaction temperatures. Feedstock intermingled with the slow moving gases have much longer. This may lead to overheating the slow moving feedstock in an effort to allow sufficient time for processing the fast moving feedstock. Alternatively, the fast moving feedstock 98 is left relatively unprocessed.

Use of static mixers as interacting with the conveyance of the biomass within the gasification machine has generally not been discussed nor has the static mixing been fully considered. What is needed is a gasification machine using static mixing mechanisms, preferably including a static mixer both inside and outside the retort tube through which the feedstock 98 passes. Desirably, the static mixing mechanisms provide turbulence that aids in the processing of the biomass.

SUMMARY OF THE INVENTION

The present invention provides static mixers interacting with the conveyance of the biomass within a gasification machine. The gasification machine uses static mixing mechanisms, preferably including a static mixer both inside and outside the retort tube through which the feedstock 98 passes. The static mixing mechanisms provide turbulence that aids in the processing of the biomass.

Disclosed is a pyrolysis apparatus, including a retort tube, a vortex separator, and a plurality of fins. The retort tube may be in a closed loop configuration where the retort tube defines a single entrance point and two exit points. The vortex separator is joined to retort tube. A plurality of fins may be positioned in spiraling rows about the retort tube. The fins preferably extend through and are sealed to a wall of the retort tube, the fins simultaneously extending beyond either side of the wall. In such configuration the fins are positioned to be a static mixer both inside and outside the retort tube.

Advantageously, the fins and retort tube provide a static mixer both inside and outside the retort tube.

As a further advantage, the fins and retort tube cause turbulence in the feedstock and gases within the retort tube increase the rate and uniformity of heating the feedstock.

As still yet a further invention, the fins and retort tube cause turbulence in heated gases outside the retort tube, causing an increase in the rate of heating of the retort tube.

Another advantage is that the fins positioned outside the retort tube convey heat energy to a position adjacent the central axis of the retort tube.

These and other advantages will become clear through reading the description below together with the appended drawings.

These figures are presented to show the best mode of making and using the invention and in no manner limit the scope of the invention.

DETAILED DESCRIPTION

The present invention may be embodied in an apparatus 10 for converting biomass, including municipal solid waste, sewage, wood waste, biomass, paper, plastics, hazardous waste, tar, pitch, activated sludge, rubber tires, oil-based residue, coal, and modern biomass through ancient biomass into activated carbon 100 and natural gas 102. Coal is the preferred feedstock. Primary components within the apparatus, described more fully below, include the frame 20, counter weight system 40, retort tube 90, blower 140, vortex separator 180, furnace 200, airlock 230, process feed system 250, and control cabinet 240. These will be described in serial fashion below.

Frame 20

Figure 2A:
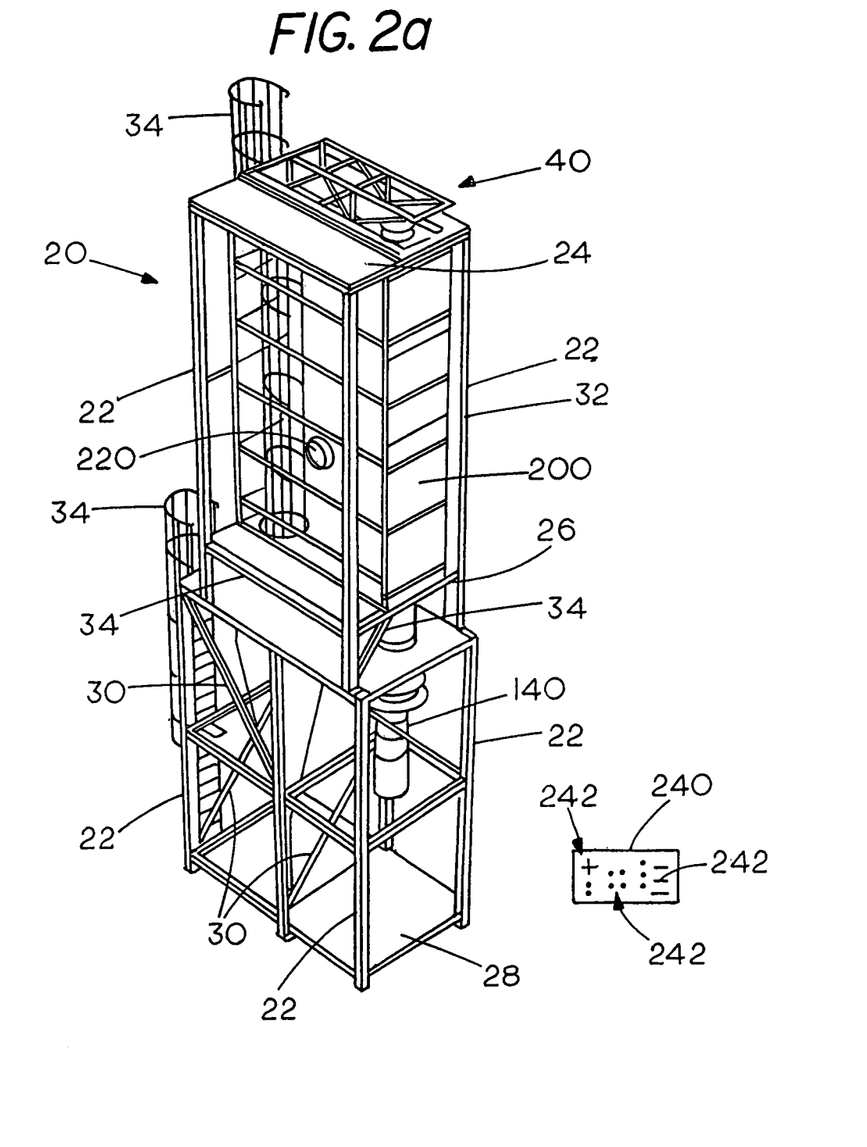
FIG. 2a is a perspective view of the apparatus frame.
Figure 2B:
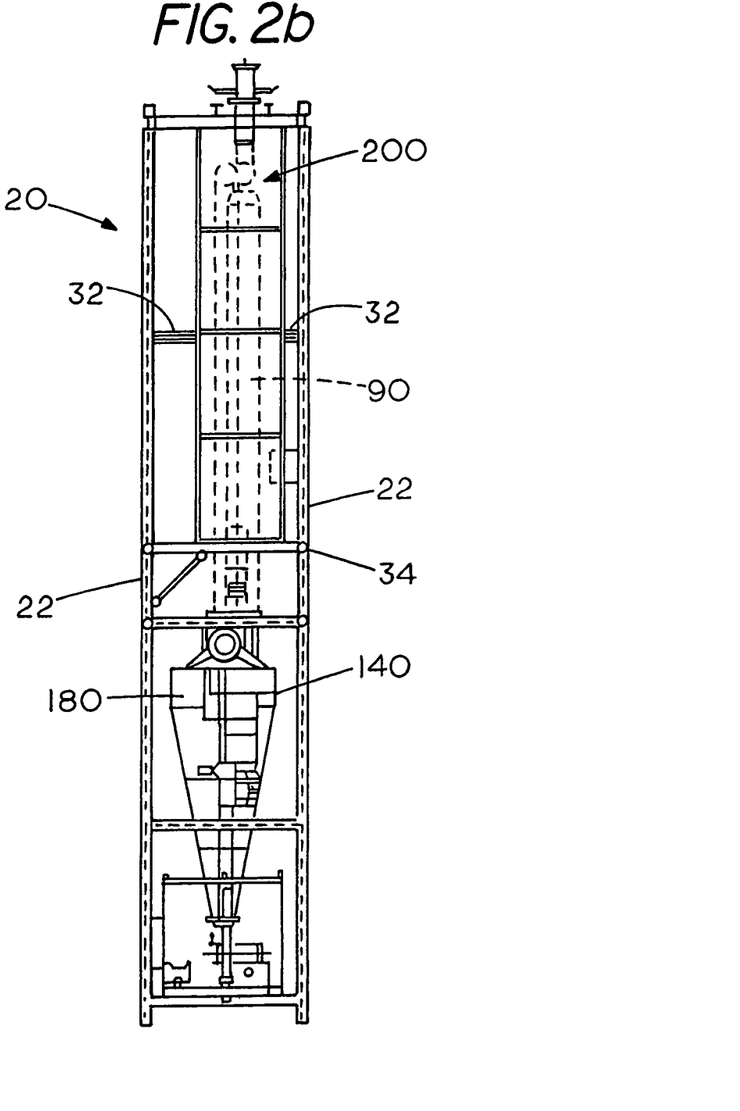
FIG. 2b is a side view shown partially in phantom of the apparatus frame.

The apparatus frame 20 may include a plurality of legs 22 joined by an upper platform 24, middle platform 26 and lower platform 28 and generally forming a rectangular cube. Cross members 30 may be joined to the legs 22, adding structural integrity. The frame 20 preferably is formed of iron or steel with suitable strength and temperature resistant properties. A plurality of attachment flanges 32 may be positioned to join the legs 22 to the furnace 200. A guard rail 34 may be provided adjacent the middle platform 26 and upper platform 24, providing a safety measure for anyone working while on top of the apparatus 10. The frame 20 may be of any size as determined by the manufacturer. A suitable size may be an eight foot by sixteen foot base. The upper platform 24 may support the counter-weight system 40 and define apertures 36 through which the counter-weight system 40 may communicate with the retort tube 90.

Counter-Weight System 40

Figure 3A:
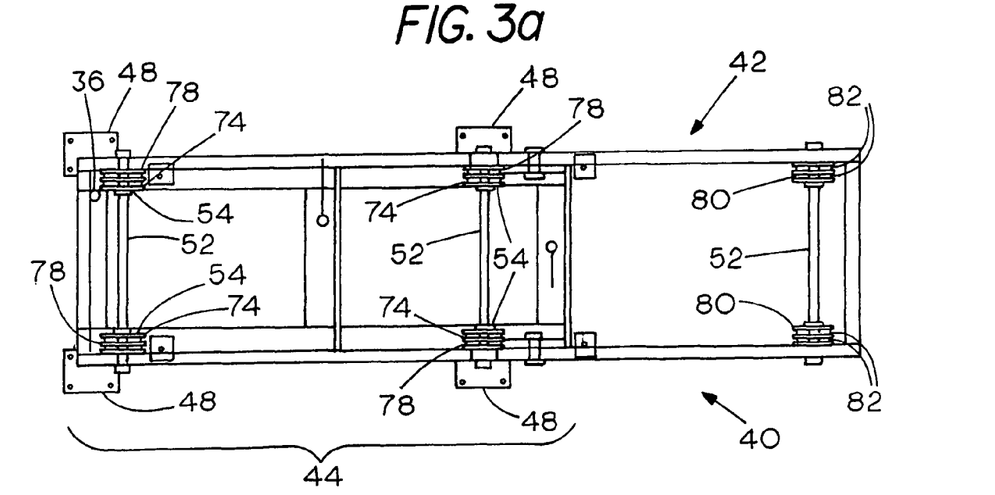
FIG. 3a is a top view of the counter-weight system.
Figure 3B:
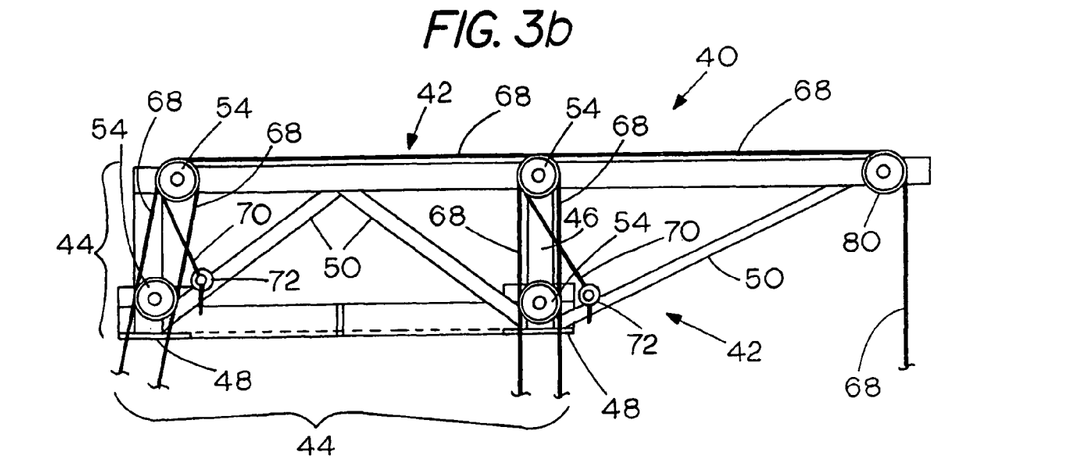
FIG. 3b is a side view of the counter-weight system.

The counter-weight system 40 may be any mechanism for supporting the retort tube 90, while allowing for expansion of the retort tube 90 under the temperature fluctuations contemplated herein. A suitable counter-weight system 40 may be joined to the upper platform 24 of the apparatus frame 20 and to the retort tube 90. Desirably a rectangular portion 44 of the counter-weight frame 42 is joined to and supported on a plurality of legs 46. The legs 46 may be joined to feet 48 and such feet 48 may be secured to the upper platform 24 of the apparatus frame 20. Cross members 50 may join to the legs 46 and rectangular portion 44, adding structural support. The rectangular portion 44, legs 46, feet 48, and cross members 50 may constitute the counter-weight frame 42.

Axles 52 may traverse and be joined to the rectangular portion 44. A plurality of pulleys 54 may be joined to the axles 52 in a manner that the pulleys 54 are rotatable in comparison with the rectangular portion 44 of the counter-weight frame 42. That is, the pulleys 54 may rotate about the axels 52 or the axels 52 may be rotatably joined to the counter-weight frame 42.

Figure 3C:
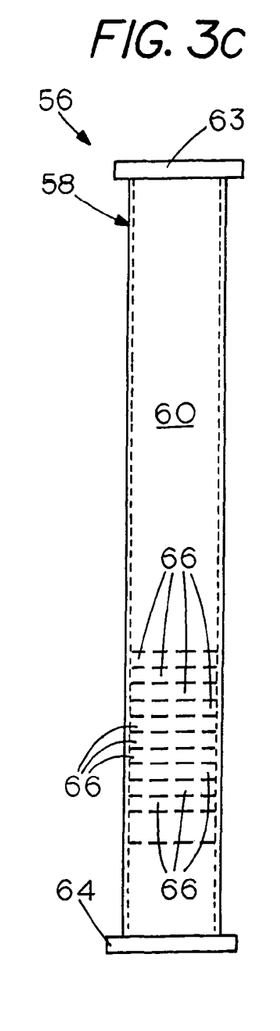
FIG. 3c is a side view of the counterbalance of the cantilever system.
Figure 3D:
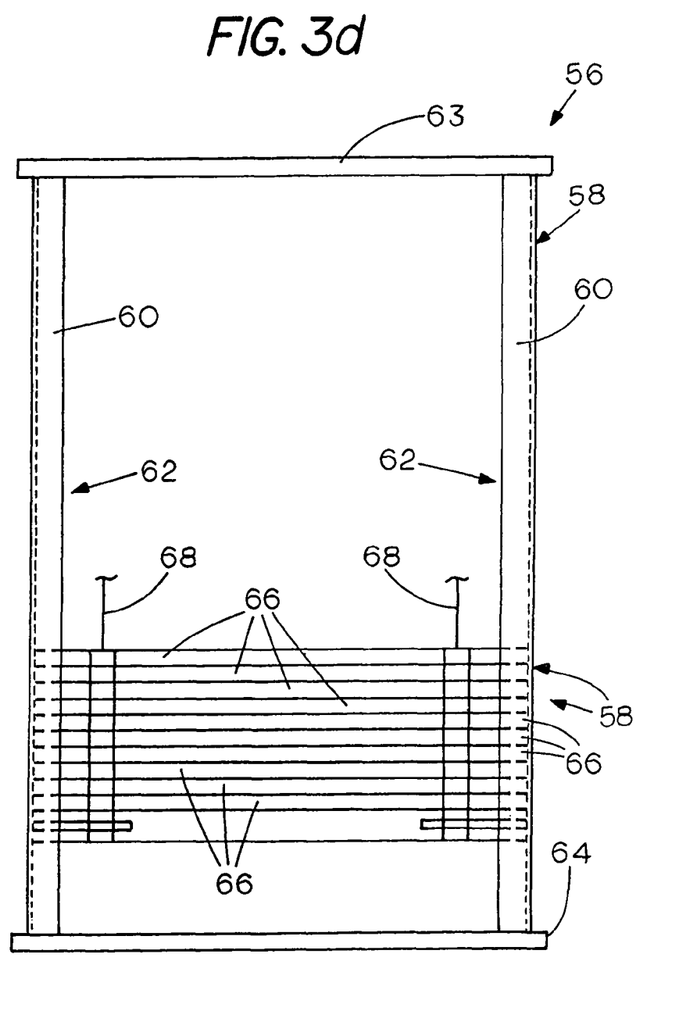
FIG. 3d is a frontal view of the counterbalance of the cantilever system.
Figure 4:
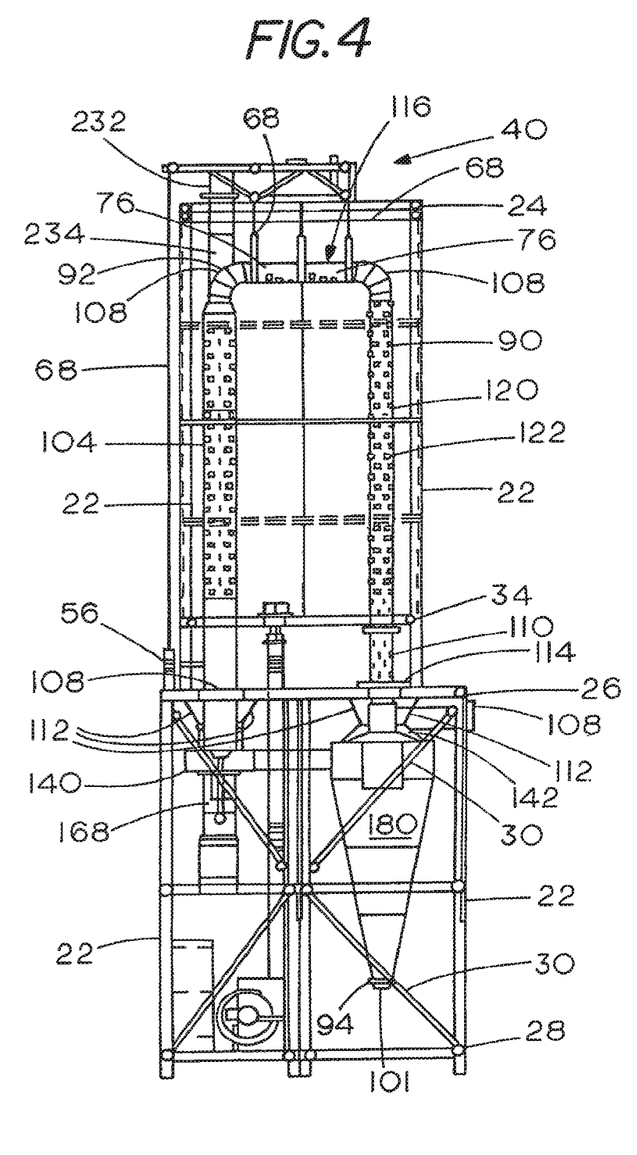
FIG. 4 is a front perspective of the pyrolysis apparatus similar to FIG. 1.

The counter-weight frame 42 is disposed as a midpoint between the retort tube 90 and a counterbalance 56. The counterbalance 56 may be secured at a suitable location to the apparatus frame 20. The counterbalance may include a counterbalance frame 58. Such frame 58 desirably includes two vertical members 60 joined to top and bottom plates 63 and 64 respectively. The vertical members 60 may be u-shaped in cross-section along the length of the vertical members 60 thereby defining a track 62 sized, shaped and adapted to receive a portion of slidable weights 66 therein.

A plurality of cables 68 may communicate force from the slidable weights 66, across the pulleys 54 of the counter-weight system 40, through the apertures 36 of the upper platform 24 and to the retort tube 90, providing a lifting force thereto. In the preferred mode of attachment, a first end 70 of the cable 68 is fastened to an eyelet 72, which in turn is secured to the upper platform 24. The cable 68 then extends over a pulley 54 in a first track 74 and down through an aperture 36. The cable 68 next along its length may slidably secure to the retort tube 90, preferably via clamp 76 and then extend back up through the same or adjacent aperture 36 to the pulley 54. The cable may engage a second track 78 of the pulley 54 and extend toward an end pulley 80. A plurality of tracks 82 may be provided in the end pulley 80, one for each cable 68 secured along various locations of the retort tube 90 as shown. The cable 68 extending from the end pulley 80 connects to the slidable weights 66, which are intended to be suspended in slidable engagement with the track 62 of the counterbalance 56.

The cable 68 may be of any material of sufficient strength to suspend the slidable weights 66 over time, of sufficient flexibility to securely engage the pulleys 54 of the counter-weight system 40 and of sufficient thermal properties to engage the retort tube 90 in operation. A suitable material is steel cable. The amount of slidable weights 66 may be of a mass determined by trial and error, however, the mass should be sufficiently heavy to support the retort tube 90 in its heated/expanded state and sufficiently light to allow the retort tube 90 to lift the weights 66 as the retort tube 70 contracts during cooling. The slidable weights 66 should be suspended at a point along the track 62 of the counterbalance 56 such that the weights 66 maintain a constant lifting force on the retort tube 90 throughout the entire range of contraction and expanded states of the retort tube 90.

Retort Tube 90

Figures 8, 9, 10:
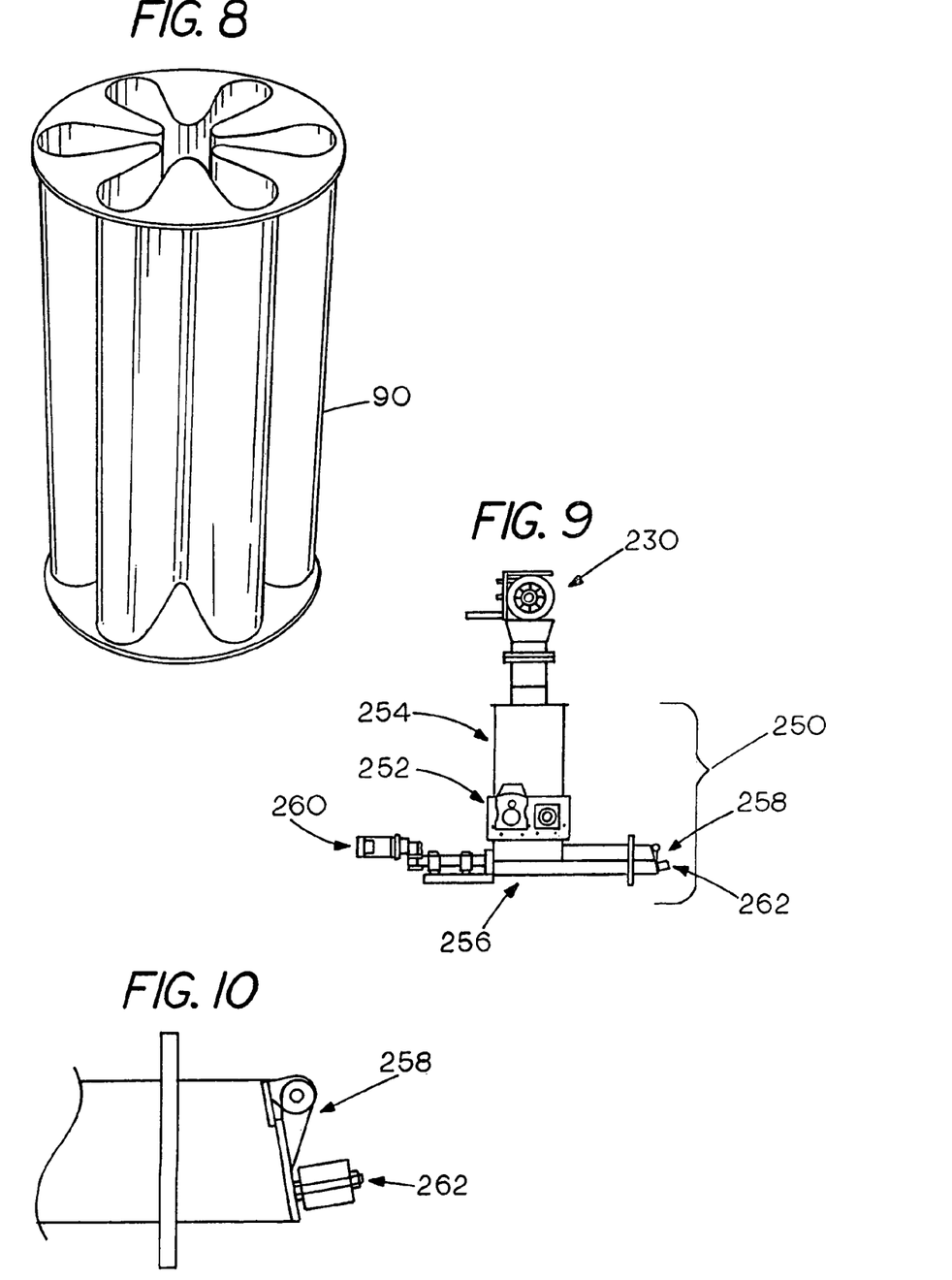
FIG. 8 is an alternative configuration of the retort tube.
FIG. 9 is a diagram of the process feed system.
FIG. 10 is a more detailed presentation of the back flow prevention gate within the process feed system.

The retort tube 90 may be a generally cylindrical tube or may be of alternative configuration as shown in FIG. 8 in a manner that increases surface area of the retort tube 90. The retort tube 90 is a closed loop configuration, joined to a blower 140 and a vortex separator 180, with the retort tube 90 having a single entrance point 92 and two exit points 94, 96. Coal or other feedstock 98 may be presented at the entrance point 92. After processing, activated carbon 100 may discharge through exit point 94 and natural gas 102 may discharge through exit point 96.

The retort tube 90 may be any suitable configuration, although it has been found that gravity provides benefit in conveying feedstock 98 from the entrance point 92 toward the blower 140. That is, the entrance point 92 may be positioned vertically above the blower 140. The retort tube 90 may have an enlarged diameter or volume section 104 between the entrance point 92 and the blower 140 as an accommodation for the feedstock 98. In one version, the enlarge volume section 104 may have an eighteen inch diameter compared to a twelve inch diameter throughout the remainder of the retort tube 90. The retort tube 90 may be provided with a plurality of flanges 108 suitable for connection purposes. Such flanges 108 may be joined to the blower 140, vortex separator 180 or maintenance section 110.

Figure 5:
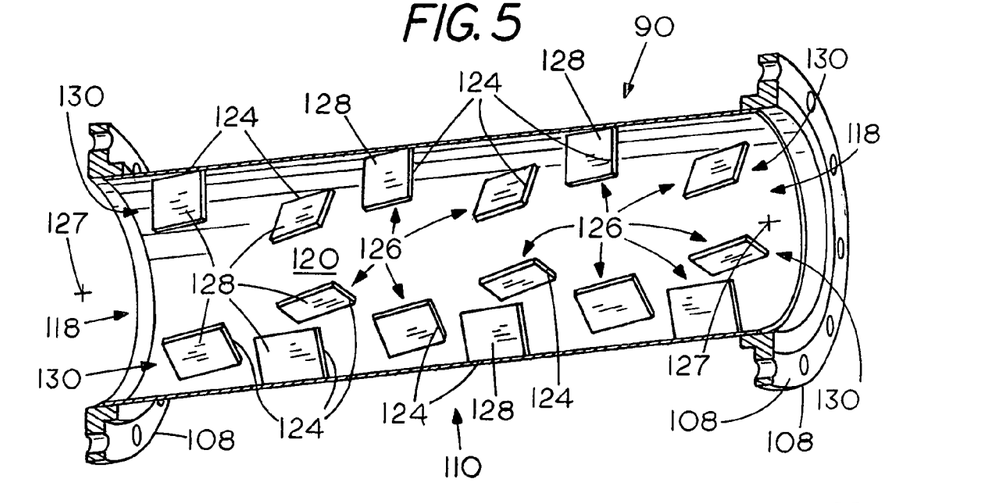
FIG. 5 is a cutaway view of the maintenance section of the retort tube taken along a plane passing through the central axis of the retort tube and exposing the interior of the retort tube.

A maintenance section 110 may be provided as part of the retort tube 90. In one mode, the maintenance section 110 is perhaps three feet long, is provided with flanges 108 and many be joined to flanges 108 of the vortex separator 180 and retort tube 90. The maintenance section 110 is selectively joined to the remainder of the retort tube 90 and vortex separator 180 and selectively removable therefrom. The maintenance section 110 provides access for maintenance purposes and may be used as an alternate site for coal insertion.

The retort tube 90 undergoes some significant expansion/contraction during heating and cooling. Accordingly, a beneficial manner of joining the retort tube 90 to the frame 20 is through suspending the retort tube 90 relative to the frame 20. The retort tube 90 may be secured via turnbuckles 112 joined at first portion 114 to the middle platform 26 and joined at a second portion 116 to the cantilever system 40 of the retort tube 90. A plurality of turnbuckles 112 may be disposed adjacent the blower 140 and vortex separator 180. Specifically, the cables 68 may secure to clamps 76, which clamps 76 are secured to the retort tube 90. As one can understand, the slidable weights 66 draw the cable 68 downward, which applies a lifting force to the retort tube 90 and consequently provides continuous support for the retort tube 90 throughout the entire range of expansion and contraction of the tube 90.

The volume of feed stock that can be moved through the retort within a determined period of time is directly related to transmission of heat energy into the retort tube 90. The furnace 200 is in thermal communication with the interior space 118 of the retort tube 90 through the wall 120 thereof. That is, heat energy from the furnace 200 transmits to the gaseous vapors 122 in the retort tube 90 through the wall 120 or the retort tube 90. Fluid dynamics provide that the heat is more easily communicated through the wall 120 and other metal surfaces, than through the gas vapors 122 in the retort tube 90, leaving a relatively cool area in those places more distant from the wall 120. Accordingly, fins 124 may be positioned extending through the wall 120 of the retort tube 90. The fins 124 may be welded to the wall 120 to preclude seepage of gaseous vapors 122 out of the retort tube 90.

The fins 124 may be a variety of sizes and concentrations. The sizes and concentration of fins 124 is a balance between avoidance of coking, e.g. build-up of carbon, inside the retort tube 90 and the advantages of heat transfer and turbulence within the retort tube 90. More and larger fins 124 lead to more coking, but also provide greater turbulence and more heat transfer.

One such balance has the fin 124 sized 3"×8"×⅜" in the enlarged section 104, 3"×3"×⅜" in the maintenance section 110 and 3"×6"×⅜" in all other locations. The fins 124 may vary in size between two and six inches wide, between two and eight inches long and between one-quarter and one-half inches thick. The fins 124 are inserted half way through the wall 120 such that at least some of the fins simultaneously extend beyond either of the opposing sides of the wall 120. The fins 124 are sealed to the wall 120 perhaps with a high quality weld, except in the maintenance section 110 where the fins 124 extend into the retort tube 90, but are flush with the wall 120. The flush position allows insulation to be placed about the maintenance section 110. Ideally, the upper surface 126 of the fins 124, in this example ⅜", have a small surface area avoiding build-up of feedstock on top of the fins 124, but the dimension needs to be thick enough to not wear out too quickly. The planar surface area is benefitted from increased size, which allows for greater heat transfer.

This same balance may have the fins 124 numbering from 1 to an amount that causes excessive coking. The fins 124 may have six rows, extending lengthwise, around the 12" diameter portion of the retort tube 90 and eight rows, extending lengthwise, around the 18" diameter retort tube. The fins 124 may be approximately equal distance between the rows and this distance may be approximately the same as the distance between the Fins 124 within a single row. Different numbers and spacing are possible, although the fins 124 should extend at least one inch into the retort tube 90 and include at least two rows.

The angle of incidence of the fins 124 to the general flow direction, e.g. central axis of retort tube 90, provides advantages of turbulence, which causes the feedstock 98 to reach processing temperatures faster. The major surfaces 128 of the fins 124 may be tilted relative to the central axis between one and twenty degrees, preferably are tilted between six and ten degrees and most preferably are tilted six degrees.

Further, the rows 130 of fins 124 ideally spiral around the retort tube 90. Optimal rates of rotation depend upon the rate of flow of the gas 102, angle of the fins 124 and distance between the fins 124, but can be determined through experimentation. The rate of rotation should cause the fins 124 to operate as a static mixer.

Blower 140

Figure 6:
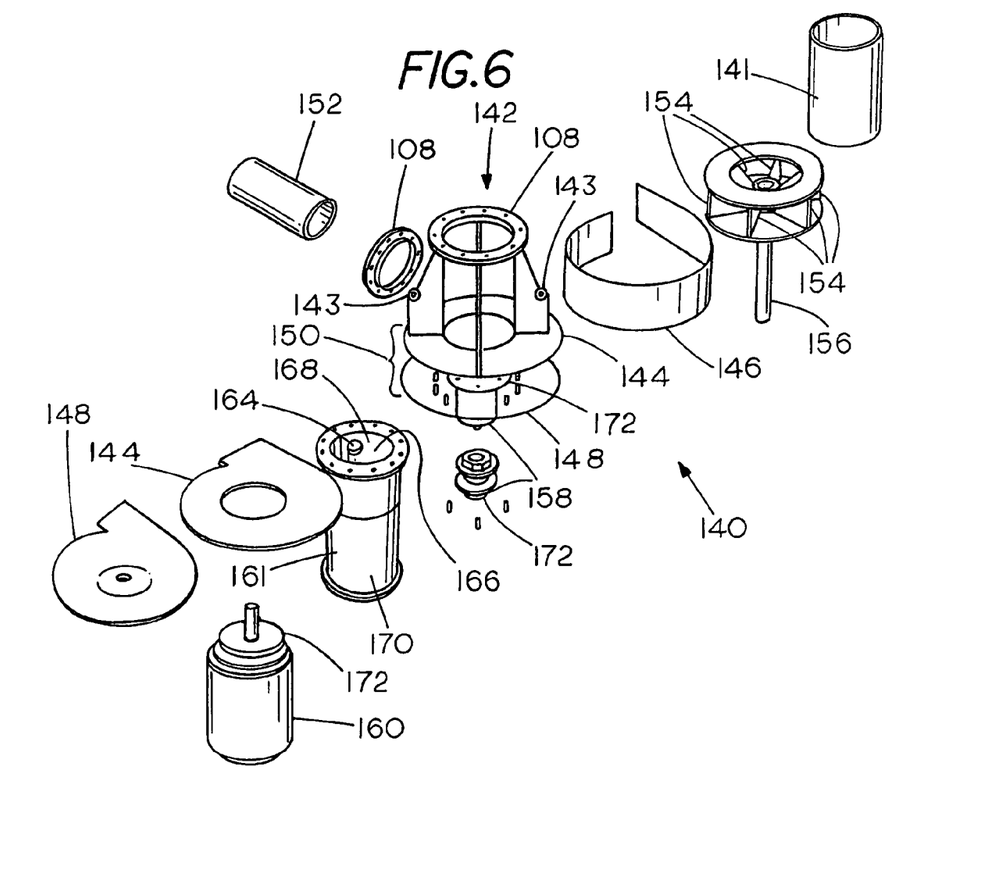
FIG. 6 is an exploded diagram of the blower.

The blower 140 may include an upper mount 142 joined to a flange 108, which in turn is selectively joinable to the flange 108 of the retort tube 90. The upper mount 142 is joined to a top plate 144 of the blower 140. Tube segment 141, which is joined between flange 108 and top plate 144 of the upper mount 142 is shown removed for clarity. The top plate 144 is joined to a blower wall 146 and lower plate 148, cooperatively defining a fan blade chamber 150. The blower wall 146 may be joined to an exit port 152 with a flange 108 mounted on the end thereof. Accordingly, one skilled in the art will notice the gas 102 from the retort tube 90 may flow through the upper mount 142, contact the blower blades 154 inside the fan blade chamber 150 and exit the blower 140 through the exit port 152.

Turnbuckle apertures 143 may be defined in the upper mount 142 for engagement with turnbuckles 112. Turnbuckles 112 join the blower 140 to the middle platform 26, thus supporting the blower 140 and retort tube 90 in a suspension manner.

The blower blades 154 may be joined to a rotatable shaft 156. The rotatable shaft 156 extends through a seal and bearing configuration 158 (a suitable seal is sold as part no. M184592 by John Crane Corporation of Morton Grove, Ill., and suitable bearings from Dodge Bearing of Fort Smith, Ark. sold as part no. 023141 and part no. 070687 for the seal and bearing configuration 158. The seal and bearings configuration 158 provides both a heat seal and environmental seal, holding the heated natural gas 102 in the fan blade chamber 150 and holding the ambient oxygenated air and coolant outside the fan blade-chamber 150. The motor 160 is sized and adapted to transmit rotational forces to the rotatable shaft 156, which in turn is sized and adapted to transmit rotational forces to the blower blades 154. The blower blades 154 are sized and adapted to draw natural gas 102 through the retort tube 90, into the fan blade chamber and out through the exit port 152.

A housing 161 sealably joins to the plate 148 and extends co-axial with the rotatable shaft 156. The housing 161 joins to the motor 160. The housing includes an entrance port 162 and an exit port 164 and defines a fluidizable chamber 166. Coolant 168 may be communicable through entrance port 162 into the fluidizable chamber 166. The coolant 168 is in thermal communication with the rotatable shaft 156. Coolant 168 may be communicable through exit port 164 away from the fluidizable chamber 166. The housing 161 may further include a maintenance port 170 for access to an examination of bearings 158. The housing 161 may be joined to one or more partitions 172; the partitions 172 being sized and adapted to sequester the bearings 158 from the coolant 168. Thus, one skilled in the art can understand that the rotatable shaft 156, housing 161, and partitions 172 define the fluidizable chamber 166, often referred to as a water jacket.

Vortex Separator 180

Figure 7A:
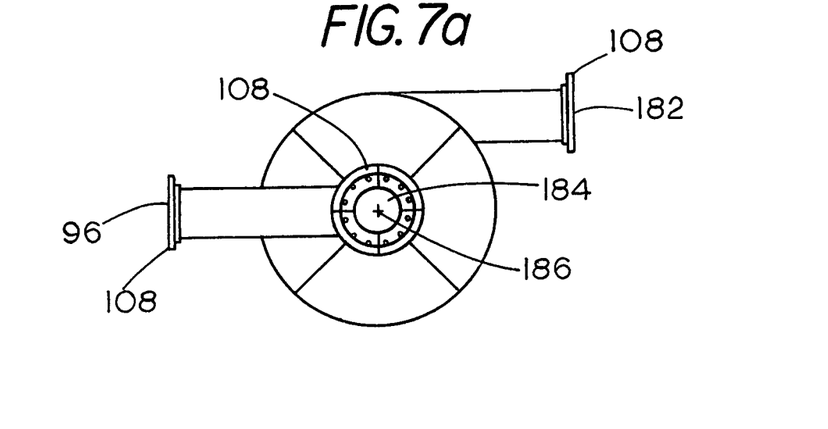
FIG. 7a is a top view of the vortex separator.
Figure 7B:
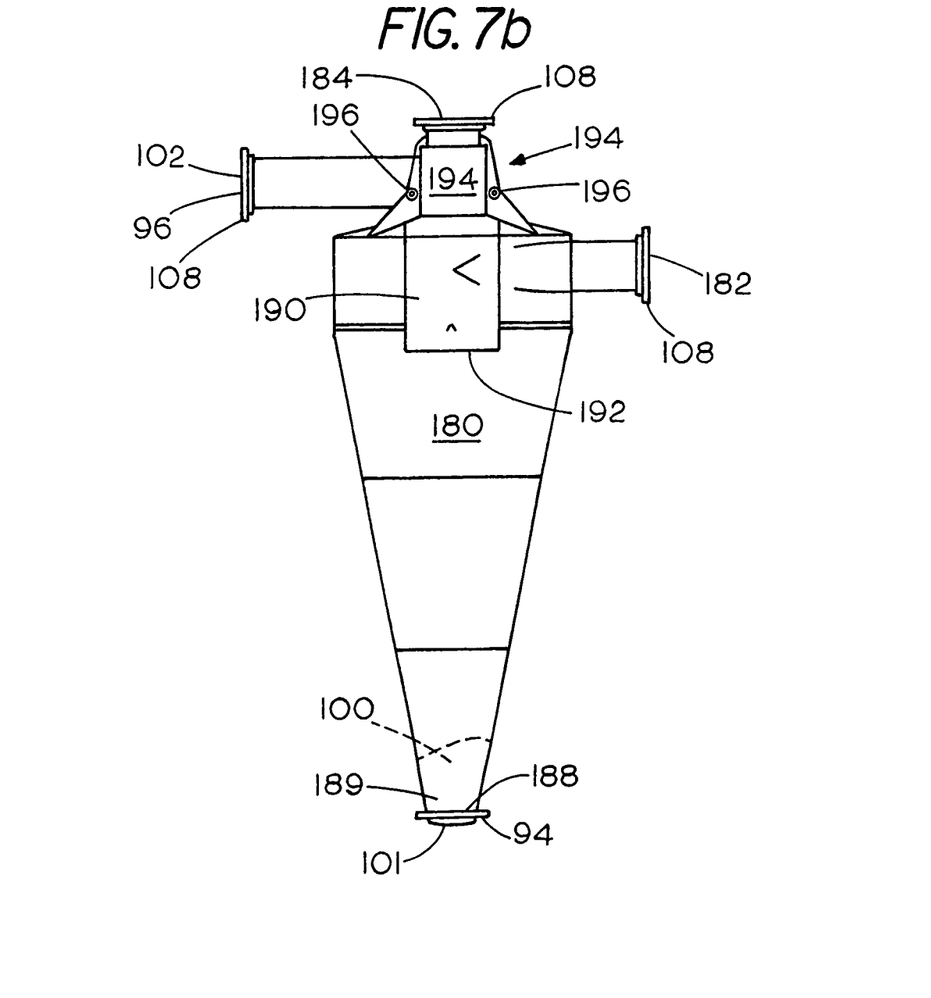
FIG. 7b is a frontal view of the vortex separator.

The vortex separator 180 separates activated carbon 100 from natural gas 102 by slowing the speed of the natural gas 102. The vortex separator 180 may have an entrance port 182 a retort exit port 184, and exit points 94 and 96. Activated carbon 100 may discharge from the apparatus 10 at exit point 94 and liberated natural gas may discharge from the apparatus 10 at exit point 96.

The entrance point 182 may have a flange 108 selectively joined to flange 108 of the blower 140. The entrance point 182 desirably is offset from the central axis 186 of the vortex separator 180, relieving abrasiveness from the activated carbon 100 that may affect wear and to enhance the development of a more uniform direction of gas flow.

Activated carbon 100 being denser than gas 102 falls out of the gas stream to the exit port 94. The exit point 94 may have a restrictor 188 to limit the rate at which activated carbon 100 discharges from the exit point 94. A rotary air lock may be installed in a discharge carbon cooling system, not shown, to preclude entrance of ambient air into the apparatus 10 and resultant unintended reactions. A suitable airlock is available from Prater and sold under the tradename Pav-12 C/S Airlock.

An exit point 96 may be sized and adapted to receive excess gas 102, liberated from the feedstock 98. The exit point 96 desirably is positioned at an elevated location from the entrance port 182, assuring the activated carbon 100 has left the gaseous stream. Gas 102 in excess of that needed to fill the retort tube 90, blower 140 and vortex separator 180 is removable through the exit point 96 for condensation and sale or consumption in the furnace 200.

A retort access port 190 may be secured to and biased into the vortex separator 180 and the retort tube 90. A lower lip 192 of the retort access port 190 may be positioned below the entrance port 182 and the retort access port 190 may project upwardly from the lower lip 192. (The exit point 96 may be similarly positioned and structured if desired.) The orientation of the retort access port 190 precludes activated carbon 100 from re-entering the retort tube 90.

An upper mount 194 of the vortex separator 180 may be joined to the vortex separator 180 and a flange 108. The flange 108 of the upper mount 194 may selectively and sealably secure to a flange 108 of the retort tube 90, providing fluid communication between the retort tube 90 and the vortex separator 180 through the retort access port 190 and upper mount 194. The upper mount 194 may define turnbuckle apertures 196 for engagement with turnbuckles 112. Turnbuckles 112 join the vortex separator 180 to the middle platform 26, thus supporting the vortex separator 180 and retort tube 90 in a suspension manner.

Furnace 200

Figure 1:
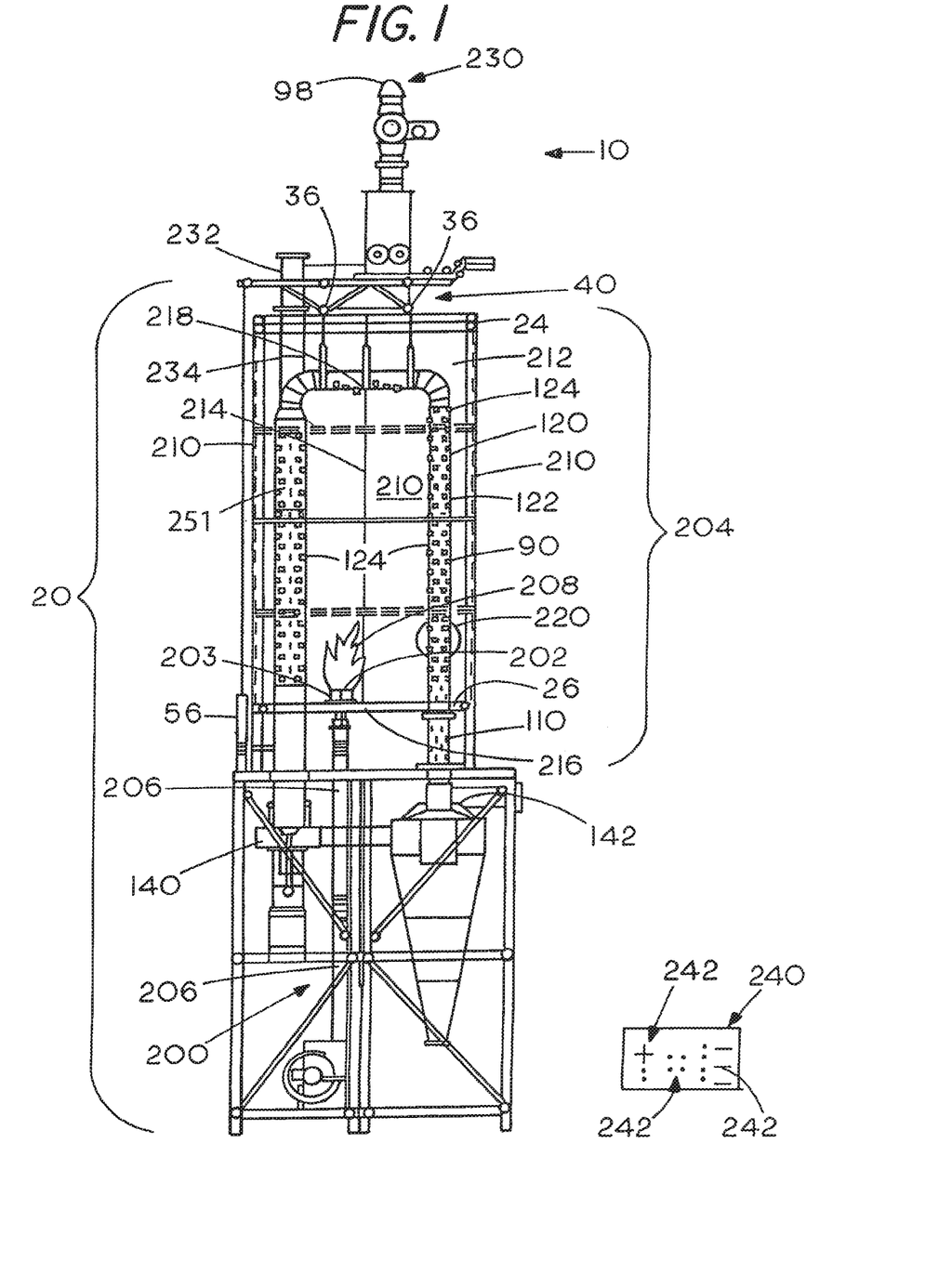
FIG. 1 is a front view of the pyrolysis apparatus.

The furnace 200 may have a burner 202 and a furnace box 204. The burner 202 should be sized and adapted to raise the temperature inside the retort tube 90 to at least 1500 Fahrenheit. A suitable burner is available from Maxon and sold under the tradename Max-fire. Extensions 206 may be used to elevate the burner 202 through and aperture 203 defined in the middle platform 26 such that the flame 208 in positioned inside the furnace box 204. The burner 202 may obtain fuel from any source of the appropriate type of fuel including from feedstock 98 that has been processed in accordance with the apparatus and procedure described herein.

The furnace box 204 may be any box sized and adapted to contain at least a portion of the retort tube 90 in both the expanded and contracted states. Attachment flanges 32 may secure to a plurality of sidewalls 210. The sidewalls 210, upper platform 24 and middle platform 26 may be sealed at the edges to form an enclosed furnace box 204, wherein the furnace bottom 26 mounts burner 202. Insulation 212 may be secured to either the inner or outer surfaces of the sidewalls 210, upper platform 24 and middle platform 26, minimizing heat loss. Insulation 212 may also be secured about those parts not in the furnace box 204, including portions of the retort tube 90, vortex separator 180 and portions of the blower 140 for a like purpose.

A heat directional wall 214 may be positioned as a partial wall with a lower edge 216 positioned across the middle platform 26, extending cross directional to the retort tube 90, extending between and secured to two sidewalls 210 and having an upper edge 218 positioned below the retort tube 90. An exhaust aperture 220 may be defined in one of the sidewalls 210, preferably adjacent the furnace bottom 26. The exhaust aperture 220 should be positioned on a side of the heat directional wall 214 opposite the burner 202. In this manner, heat exhaust from the burner 202 rises along one side of the retort tube 90 interacting with the fins 124, as previously described, moves over the upper edge 218 of the heat directional wall 214, down to and out the exhaust aperture 220.

Airlock 230

The upper airlock 230 is any apparatus suitable for discharging feedstock into process feed system 250 at a controllable rate, to maintain process feed system 250 level in the feed system hopper 254 and as a fire block to keep unanticipated back-flow combustion from entering the unfed feedstock 98. A suitable airlock is available from Prater and sold under the tradename Pay-12 C/S Airlock.

Process Feed System 250

The process feed system 250, joined to the downstream end of the airlock 230 and the entrance tube 232. The process feed system 250 regulates the rate of flow of and communicates feedstock 98 ultimately into the retort tube 90, while substantially and simultaneously precluding air from entering the retort tube 90. The process feed system 250 preferably includes a pair of scalping augers 252 joined to a feed system hopper 254 and a feed auger 256. The scalping augers 252 are rotatable in opposing direction to each other and generally perpendicular to the feed auger 256. The feed 256 auger is rotatable in a direction that moves feedstock 98 away from the scalping augers 252 and toward the flap 258 and entrance tube 232. The feed auger 256 is joined to and controlled by and adjustable rate motor 260, which motor 260 controls the speed of rotation of the feed auger 256 and thus the volumetric flow rate of the feedstock within the entrance tube 232. The flap 258 may be hinged to the feed auger 256 and joined to weights 262 and such weights may be adjustable in terms of total mass.

Thus, in operation, feedstock 98 from the airlock 230 may flow to the feed system hopper 254. Gravity or other means may direct the feedstock 98 to the scalping augers 252. The scalping augers 252 rotate sufficiently fast to moves the feedstock 98 to the feed auger 256 and keep the feed auger 256 full. The feed auger 256 rotates at an adjustable and determinable rate sufficient to push open the flap 258 and continuously eject a desired amount of feedstock into the entrance tube 232. The desired amount of feedstock 98 is preferably the maximum amount of feedstock 98 that will process within the retort tube 90 prior to being removed through the vortex separator 180. That is, the main feed auger 256 controls the feed rate, e.g. amount/time, to be sufficient to allow for substantial processing of the feedstock 98 prior to collection of the resultant activated carbon 100 in the vortex separator 180. The flap 258, being weighted, packs feedstock 98 within the feed auger 256, further precluding air from accessing the retort tube 90. The feed rate control/back flow preventer flap 258 thus maintaining proper levels in the main feed auger 256 to provide consistent delivery rates. The flap 258 further provides back flow protection caused by unexpected reactions within the process. Thus, the airlock 230 and the process feed system 250 meters feed stock 98 to the entrance tube 232, which in turn is joined to the retort tube 90 at the entrance point 92. A diffuser 234 may be disposed adjacent the downstream end of the entrance tube 232 and be sized, positioned, adapted and structured to disperse the feedstock 98 in the retort tube 90.

Control Cabinet 240

A control cabinet 240 with various sensors 242 may monitor various states of being at various locations throughout the apparatus 10. For instance, a sensor 242 may be electrically joined to the retort tube 90 to monitor the temperature. A sensor 242 may be electrically joined to the airlock 230 for monitoring the flow rate or feedstock volume. Persons skilled in the art will notice a variety of locations where sensors may be placed in and throughout the apparatus 10.

The control cabinet 240 may include both transmitting and receiving functions together with logic sufficient to control the apparatus 10. For instance, if a sensor 242 associated with the retort tube 90 reports that the temperature is below operating temperature, the controller may transmit to the airlock 230 to slow or stop the flow rate of the feedstock 98. Various other logics, sensors, data received and data transmitted are known to those of ordinary skill in the art of designing and operation of control cabinets 240.

Operation

The furnace 200 may first be supplied with fuel and lit. The fuel may be from previous processed feedstock 98 or from an alternate source. The flame 208 supplies heated exhaust, which heats the interior of the furnace box 204 to an operating temperature. Such temperature is a temperature sufficient to pyrolize the feedstock 98, for instance 1600 degrees Fahrenheit. The flame 208 being positioned on one side of the heat directional wall 214 transmits heat energy in the form of exhaust in close proximity to a portion of the retort tube 90 positioned adjacent the flame 208. The exhaust moves upwardly until the heat can move over the upper edge 218 of the heat directional wall 214. Heated exhaust moving over the upper edge 218 is positioned adjacent additional portions of the retort tube 90. Continued production of exhaust pushes exhaust that has migrated over the heat directional wall 214 down along still another portion of the retort tube 90 and out an exhaust aperture 220.

The migrating exhaust, e.g. the exhaust moving from the flame 208, over the heat directional wall 214 and out the exhaust aperture 220, communicates heat energy to the fins 124 and the retort tube 90. The fins 124 and retort tube 90, being formed of a material having high heat transfer properties, transmit heat into the retort tube 90. The fins 124 projecting both into and out of the retort tube 90 are positioned, sized and adapted to form a static mixer. Thus, the exhaust is statically mixed along the path from the flame 208, along the retort tube 90 to the exhaust aperture 90. An important feature of the fins 124 is the surface area. That is, the larger the surface area of the fins 124, the more heat energy that can be transferred into the retort tube 90.

A sensor 242, in communication with the retort tube 90 and control cabinet 240 communicates a signal to the control cabinet 240 once the retort tube 90 reaches the user determined operating temperature. The control cabinet 240 may then transmit a signal to the blower 140, if not previously initiated, and the airlock 230, which will now be discussed.

The process feed system 250 and entrance tube 232, with diffuser, controls and distributes feedstock 98 within the apparatus 10. Feedstock 98 is conveyed through airlock 230 into the process feed system 250 continuing to the entrance tube 232 in the mode and manner known by those skilled in the art. The feedstock 98 is directed at a diffuser 234, which scatters the feedstock 98 within the retort tube 90. The feedstock 98 in the retort tube 90 is rapidly heated to perhaps 1600 degrees Fahrenheit whereupon the natural gas within the feedstock 98 evaporates out of the feedstock 98, yielding activated carbon 100 and natural gas 102.

The blower 140 circulates the gaseous environment inside the flow chamber 251 at a desired speed. The flow chamber 251 is the area inside the retort tube 90, blower 140 and vortex separator 180 through which the feedstock 98, activated carbon 100 and natural gas 102 flow during operation. Thus, feedstock 98 received from the airlock 230 enters the flow chamber 251 and is drawn by the fan blades 154 into the blower 140. The blades 154 push the feedstock 98 or activated carbon 100 and natural gas 102 to the vortex separator 180 via the retort tube 90. The fins 124 being sized, shaped and adapted to be a static mixer inside the flow chamber 251. The fins 124 statically mix the heated gaseous environment, devoid of oxygen, and feedstock 98 in the flow chamber 251, causing the feedstock 98 to heat faster than without the static mixing. The speed of flow decreases in the vortex separator 180 such that the activated carbon 100, now fully processed, falls out of the gas stream. A portion of the natural gas 102 re-enters the retort tube 90 and the cycle repeats. Excess natural gas 102, e.g., that captured from the feedstock 98, exits the vortex separator 180 through the exit point 96 for collection and sale or use. The activated carbon 100 is removed from the vortex separator 180 through the exit point 94.

The blower 140 is positioned such that the blades 154 are in the path of the feedstock 98 or activated carbon 100, depending upon the time of conversion of the feedstock 98 to activated carbon 100, and physically contact the feedstock 98 or activated carbon 100. The blades 154 being positioned in the high heat environment require cooling. Coolant 168 is directed into entrance port 162 through the fluidizable chamber 166 and out through exit port 164 and comes into contact with the shaft 156 in the fluidizable chamber 166. Heat that the blades 154 obtain from the flow chamber 251 transfers to the shaft 156 and heat from the shaft 156 is transferred to the coolant 168. In this manner, the coolant 168 cools the blades 154 such that the blades 154 do not become deformed in the high heat environment. feedstock 98 evaporates out of the feedstock 98, yielding activated carbon 100 and natural gas 102.

Thus, one skilled in the art can see that feedstock 98 enters through the airlock 230 on to the process feed system 250 continuing into the entrance tube 232 and is diffused by the diffuser 234 and enters the retort tube 90. The feedstock 98 and gaseous atmosphere is statically mixed while being drawn into the fan blades 154. The fan blades 154 direct the feedstock 98, now desirably processed into activated carbon 100 and natural gas 102, to the vortex separator 180. The activated carbon 100 is removed through exit point 94. The natural gas 102 is re-circulated through the retort tube 90 with the excess natural gas 102 flowing out the exit point 96 for sale or use.

The apparatus 10 has been described with reference to the appended drawings and the best mode of making and using the present invention known at the time of filing. One can see that various modifications, some of which have been mentioned can be made without departing from the spirit and scope of the present invention as is set forth in the claims below.

We claim:

1. A pyrolysis apparatus, comprising:
    a retort tube in a closed loop configuration with a vortex separator and a blower, the retort tube defining a single entrance point, and the vortex separator joined to an end of the retort tube and the vortex separator defining a solids exit point and a vapor exit point from the closed loop configuration;
    a furnace configured to apply heat to the retort tube; and
    at least one fin positioned extending through and sealed to a wall of the retort tube, the fin simultaneously extending beyond either side of the wall.

2. The apparatus of claim 1 wherein there are a plurality of fins.

3. The apparatus of claim 2 further comprising rows of fins.

4. The apparatus vice of claim 3 wherein the rows of fins spiral around the retort tube.

5. The apparatus of claim 2 wherein the fins are positioned to be a static mixer.

6. The apparatus of claim 2 wherein the fins are between two and six inches wide, between two and eight inches long and between one-quarter and one-half inches thick.

7. The apparatus of claim 2 wherein the fins have an angle of incidence and the angle of incidence of the fins sufficient to cause turbulence.

8. The apparatus of claim 7 wherein the angle of incidence is between one and twenty degrees.

9. The apparatus of claim 8 wherein the angle of incidence is between six and ten degrees.

10. The apparatus of claim 9 wherein the angle of incidence is six degrees.

11. The apparatus of claim 1 further comprising a selectively removable maintenance section being a portion of the retort tube.

12. The apparatus of claim 11 further comprising a plurality of fins, the fins extending into the maintenance section of the retort tube and being flush with one side of the wall.

13. A pyrolysis apparatus, comprising:
    a retort tube in a closed loop configuration with a vortex separator and a blower, the retort tube defining a single entrance point, and the vortex separator joined to an end of the retort tube and defining a solids exit point and a vapor exit point from the closed loop configuration;
    a furnace configured to apply heat to the retort tube; and
    a plurality of fins joined to the retort tube, the fins being positioned to be a static mixer.

14. The apparatus of claim 13 wherein the fins form a static mixer inside and outside the retort tube.

15. The apparatus of claim 13 wherein the fins have an angle of incidence and the angle of incidence of the fins sufficient to cause turbulence.

16. The apparatus of claim 15 wherein the angle of incidence is between one and twenty degrees.

17. The apparatus of claim 16 wherein the angle of incidence is between six and ten degrees.

18. The apparatus of claim 17 wherein the angle of incidence is six degrees.

19. A pyrolysis apparatus, comprising:
    a retort tube in a closed loop configuration with a vortex separator and a blower, the retort tube defining a single entrance point, and the vortex separator joined to an end of the retort tube and defining a solids exit point and a vapor exit point;
    a furnace configured to apply heat to the retort tube; and
    a plurality of fins positioned in spiraling rows about the retort tube, the fins extending through and sealed to a wall of the retort tube, the fins simultaneously extending beyond either side of the wall and being positioned to be a static mixer inside and outside the retort tube.

* * * * *

UNITED STATES PATENT AND TRADEMARK OFFICE
CERTIFICATE OF CORRECTION

PATENT NO. : 10,030,199 B2  
APPLICATION NO. : 12/925488  
DATED : July 24, 2018  
INVENTOR(S) : David E. Hayward and Sherman Aaron Page 1 of 1

It is certified that error appears in the above-identified patent and that said Letters Patent is hereby corrected as shown below:

On the Title Page

Line 1, (54), Delete "PYROLISIS" and insert --PYROLYSIS--, therefore.

Column 1, Line 3, Delete "North Wilksboro" and insert --North Wilkesboro--, therefore.

In the Specification

Column 1, Line 1, (Title), Delete "PYROLISIS" and insert --PYROLYSIS--, therefore.

Column 1, Line 20, Delete "LIQUIFACTION" and insert --LIQUEFACTION--, therefore.

In the Claims

Column 11, Claim 4, Line 40, after "apparatus" delete "vice".

Signed and Sealed this  
Twenty-eighth Day of May, 2019

Andrei Iancu  
*Director of the United States Patent and Trademark Office*